United States Patent [19]

Williams

[11] 3,869,026

[45] Mar. 4, 1975

[54] SHOE DRUM BRAKES
[75] Inventor: Frank Vernon Williams, Solihull, England
[73] Assignee: Girling Limited, Warwickshire, England
[22] Filed: Nov. 2, 1973
[21] Appl. No.: 412,121

[30] Foreign Application Priority Data
Nov. 17, 1972 Great Britain.................... 53120/72

[52] U.S. Cl...................... 188/79.5 GT, 188/196 B
[51] Int. Cl............................................ F16d 65/54
[58] Field of Search.......... 188/79.5 GT, 196 B, 340

[56] References Cited
UNITED STATES PATENTS
2,157,272  5/1939  Sneed.......................... 188/79.5 GT
2,286,711  6/1942  Buffington.................... 188/79.5 GT Primary Examiner—Duane A. Reger
Attorney, Agent, or Firm—Scrivener Parker Scrivener and Clarke

[57] ABSTRACT

In an internal shoe-drum brake the off position of a shoe is automatically adjusted to compensate for wear of the shoe lining by the co-operation of a resilient pawl member with a second member with which it is in one-way movable engagement, one member being mounted on the shoe and the other on a stationary back-plate of the brake.

5 Claims, 7 Drawing Figures

PATENTED MAR 4 1975

SHOE DRUM BRAKES

This invention relates to improvements in shoe-drum brakes for vehicles and has for its object to provide simple and effective means for automatically adjusting the off position of a shoe to compensate for wear of the shoe lining and to maintain the clearance between the shoe and the drum substantially constant.

According to our invention means for adjusting the off position of a shoe in a shoe-drum brake comprises a resilient pawl member and a member with which the pawl member is in one-way frictional or ratchet engagement, one member being mounted on or carried by the shoe and the other being mounted on the stationary back-plate of the brake on which it is permitted some movement in an axial direction so that the engagement of the members is not affected by axial movement of the shoe.

The relative movement between the two members when the brake is applied is preferably substantially linear, the width of the engaging portions of the members being sufficient to allow for some circumferential movement of the shoe when the brake is applied.

The adjuster is preferably located adjacent to the actuated end of the shoe where the shoe load is least so that the adjuster can be relatively light and inexpensive. In a preferred construction the pawl is mounted on the back-plate of the brake, and co-operates with the web of the shoe or with a plate mounted on the web and formed with ratchet teeth.

One example of that construction is shown in the accompanying drawings in which.

Figure 1:
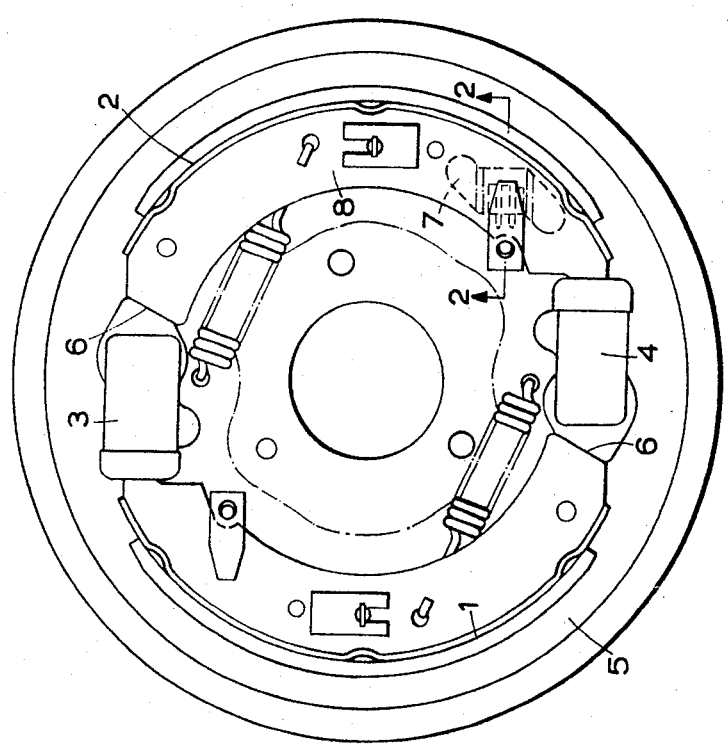
FIG. 1 is an end view of a complete brake.

The brake illustrated in FIG. 1 is a two-leading-shoe brake having shoes 1, 2 each actuated at one end by hydraulic actuators 3, 4 mounted on the stationary back-plate 5 of the brake. The other end of each shoe engages an inclined torque-taking abutment 6 on the actuator for the other shoe.

Figure 5:
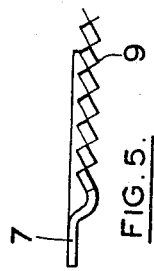
FIGS. 3, 4 and 5 are respectively a front view, a side view and a section of the ratchet.
Figure 4:
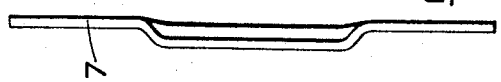
Figure 3:
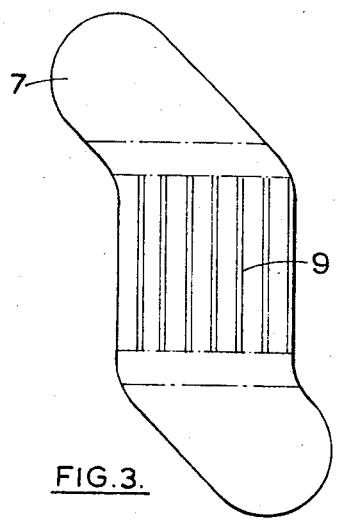

A ratchet plate 7 of the form shown in FIGS. 3, 4 and 5 is secured to the web 8 of the shoe 2 adjacent to its actuated end. The plate is a pressing of which the central part is raised or joggled relative to the ends and is formed with a series of straight parallel ratchet teeth 9. The ends of the plate are welded or otherwise secured to the web 8. It could, for example, be held between lugs pressed out of the web.

Figure 2:
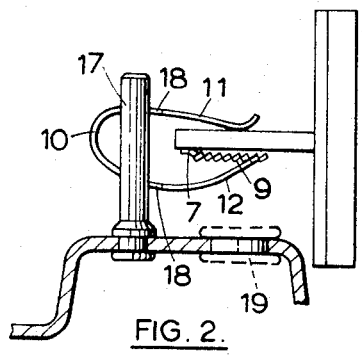
FIG. 2 is a fragmentary section on the line B—B of FIG. 1.
Figure 7:
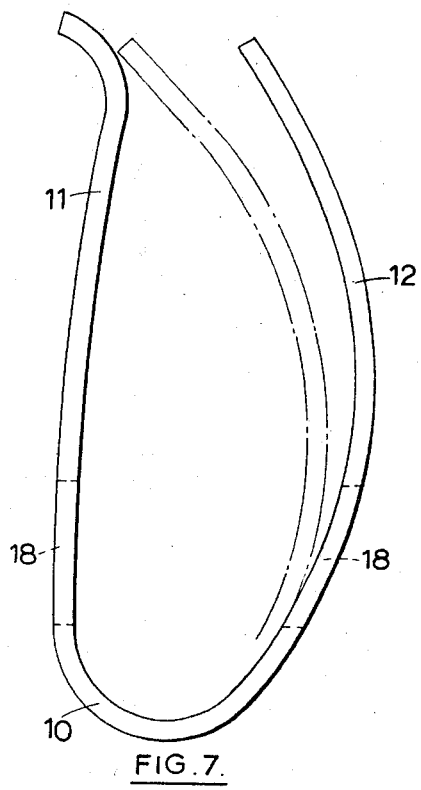
FIGS. 6 and 7 are respectively a front view and a side view of the pawl.
Figure 6:
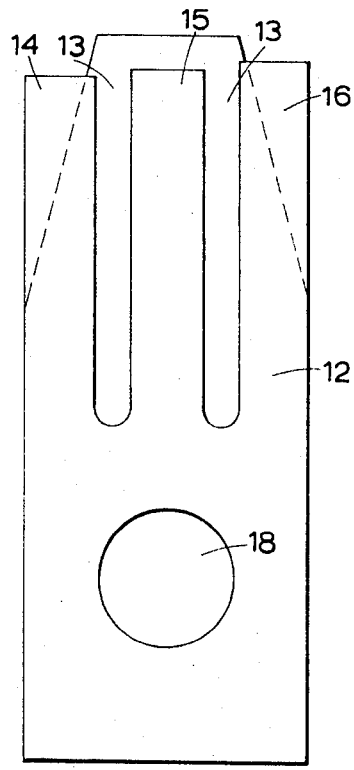

The pawl 10 shown on a larger scale in FIGS. 6 and 7 is a C-shaped member formed from resilient sheet metal and is adapted to embrace the web and ratchet plate as shown more particularly in FIG. 2. One limb 11 bears against the side of the web opposite the ratchet plate and the free end of the other limb 12 engages the ratchet teeth. The free end of this limb is divided by slots 13 to form three tongues 14, 15, 16 of progressively varying length to provide a fine adjustment with a relatively coarse tooth pitch on the ratchet.

The pawl is mounted on a pin 17 in the back-plate 5 on the radially inner side of the shoe.

The pin passes through aligned holes 18 in the limbs of the pawl, these holes being of sufficient size to provide free radial movement of the pawl equal to the desired clearance between the shoe and the drum in the off position of the brake.

The pawl is not confined on the pin in an axial direction so that it maintains its correct position relative to the ratchet if there is axial movement of the shoe.

The pawl is stressed to keep the end of the limb 12 in engagement with the ratchet and to provide a frictional drag between the shoe web and the pawl.

When the brake is applied the shoe moves outwardly into engagement with the drum. If, owing to wear of the shoe lining, the movement, after taking up the clearacce between the pin 17 and the holes 18 in the pawl, is sufficient to cause the free end of the limb 12 of the pawl to ride over one or more of the teeth on the ratchet the pawl will pick up a fresh tooth and hold the shoe in a new adjusted position when the brake is released.

The width of the co-operating parts of the pawl and ratchet is sufficient to take care of any circumferential movement of the shoe in the application of the brake.

The pin 17 is shown as being rivetted into the back-plate but it might be secured by a screwed connection to allow it to be removed when changing shoes.

An opening normally closed by a rubber plug or grommet 19 may be formed in the back-plate of the brake in alignment with the pawl to allow the insertion of a tool for holding the limb 12 of the pawl clear of the ratchet when replacing shoes.

The ratchet teeth are shown as being formed on a separate plate secured to the shoe web, but they could be formed on an angle member fixed to the shoe platform.

Alternatively the separate plate could be dispensed with and the pawl could engage directly with the shoe web. In that case ratchet teeth could be formed on the web, or the free end of the pawl could simply engage frictionally with the web, the ends of the fingers of the pawl spragging on the surface of the web.

In the embodiment illustrated the ratchet plate is mounted on the shoe and the pawl on the back-plate of the brake, but it will be appreciated that the pawl could be mounted on the shoe and the ratchet on the back-plate.

I claim:

1. Means for adjusting the off position of a shoe in an internal shoe drum brake comprising a resilient pawl member and a ratchet member with which said pawl member is in co-operative engagement for relative movement in one direction, one member being mounted on the shoe and the other on the stationary backplate of the brake, wherein said pawl member is a C-shaped member of resilient metal having two limbs of which the free ends are urged towards each other, one of said limbs bearing on one side of the shoe web and the other limb co-operating with ratchet teeth on the other side of the web.

2. Means as in claim 1 wherein the ratchet is formed by parallel teeth on a plate secured to the web of the shoe.

3. Means as in claim 1 wherein the pawl member is mounted on a pin fixed in the back-plate of the brake, and parallel to the axis of the brake, the pin passing through clearance holes in the limbs of the pawl member providing for free axial movement of the pawl member along the pin and for free radial movement of the pawl member through a distance equal to the desired clearance between the shoe and the drum in the off position of the brake.

4. Means as in claim 1 wherein the free end of the second limb of the pawl member is divided into tongues of stepped length for engagement with the ratchet teeth on the shoe web, the tongues providing a fine adjustment of the off position of the shoe with a relatively coarse tooth pitch on the ratchet.

5. Means for adjusting the off position of a shoe in an internal shoe drum brake, comprising a pawl member and a second member with which said pawl member is in co-operative engagement, one of said members being mounted on the shoe and the other on a stationary part of the brake, and wherein the pawl member is a resilient member having two limbs of which free ends are urged towards each other, one limb bearing on one surface of said second member and the other limb co-operating with ratchet teeth on an opposite facing surface of said second member.

* * * * *